(12) United States Patent
Kataoka

(10) Patent No.: US 11,775,798 B2
(45) Date of Patent: Oct. 3, 2023

(54) METHOD FOR MANUFACTURING NONCONTACT COMMUNICATION MEDIUM AND NONCONTACT COMMUNICATION MEDIUM

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 110 days.

(21) Appl. No.: 17/551,233

(22) Filed: Dec. 15, 2021

(65) Prior Publication Data

US 2022/0198239 A1 Jun. 23, 2022

(30) Foreign Application Priority Data

Dec. 22, 2020 (JP) ................. 2020-212863

(51) Int. Cl.
| | | |
|---|---|---|
| *G06K 19/077* | (2006.01) | |
| *H01Q 1/22* | (2006.01) | |
| *G06K 19/07* | (2006.01) | |

(52) U.S. Cl.
CPC ... *G06K 19/07779* (2013.01); *G06K 19/0726* (2013.01); *G06K 19/07775* (2013.01); *H01Q 1/2225* (2013.01)

(58) Field of Classification Search
CPC ......... G06K 19/07779; G06K 19/0726; G06K 19/0708; G11B 5/00813; H02J 50/12
See application file for complete search history.

(56) References Cited

U.S. PATENT DOCUMENTS

| | | | |
|---|---|---|---|
| 2003/0121985 A1* | 7/2003 | Baldischweiler | G06K 19/0723 235/492 |
| 2005/0046989 A1* | 3/2005 | Goodman | G11B 23/046 |
| 2021/0012174 A1* | 1/2021 | Ono | G11B 5/00813 |
| 2021/0089851 A1* | 3/2021 | Ueki | G06K 19/07786 |
| 2022/0172743 A1* | 6/2022 | Kumagai | B65H 75/14 |

FOREIGN PATENT DOCUMENTS

| | | |
|---|---|---|
| JP | 2006-217185 A | 8/2006 |
| JP | 2007-310898 A | 11/2007 |
| JP | 2009-271656 A | 11/2009 |

* cited by examiner

*Primary Examiner* — Mirza F Alam
(74) *Attorney, Agent, or Firm* — SOLARIS Intellectual Property Group, PLLC

(57) ABSTRACT

A noncontact communication medium includes a processing circuit that is mounted on a substrate on which an antenna coil is formed, and has an internal capacitor, and an external capacitor that composes a resonance circuit configured to resonate at a predetermined resonance frequency, along with the internal capacitor and the antenna coil. A method for manufacturing a noncontact communication medium includes measuring a temporary resonance frequency in a state in which the external capacitor is not connected to the processing circuit and in a state in which the processing circuit is connected to the antenna coil, and deciding capacitance of the external capacitor based on a degree of difference between a reference resonance frequency in a case where the noncontact communication medium performs communication with an outside through a magnetic field and a temporary resonance frequency.

9 Claims, 14 Drawing Sheets

FIG. 12
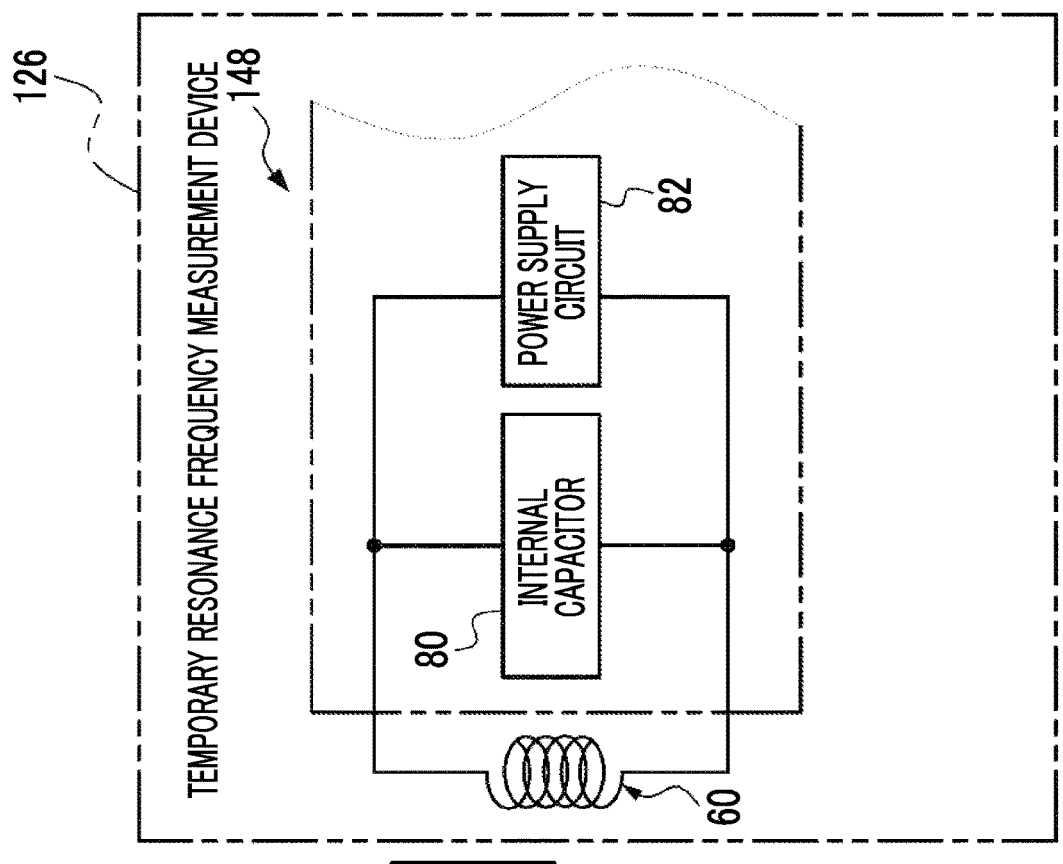
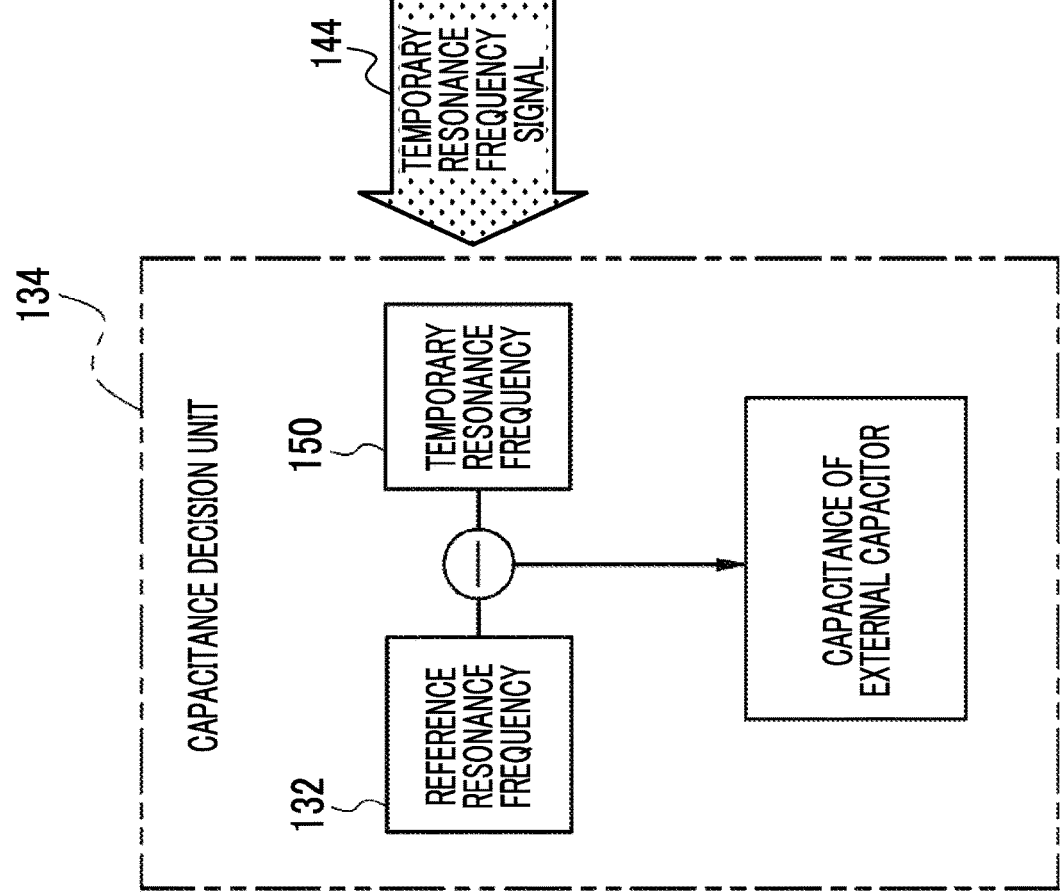

METHOD FOR MANUFACTURING NONCONTACT COMMUNICATION MEDIUM AND NONCONTACT COMMUNICATION MEDIUM

CROSS-REFERENCE TO RELATED APPLICATIONS

This application claims priority under 35 USC 119 from Japanese Patent Application No. 2020-212863 filed on Dec. 22, 2020, the disclosure of which is incorporated by reference herein.

BACKGROUND

1. Technical Field

A technique of the present disclosure relates to a method for manufacturing a noncontact communication medium and a noncontact communication medium.

2. Related Art

JP2007-310898A discloses a noncontact IC module having a substrate, an antenna section formed on one surface of the substrate, an IC chip formed on one surface, and a common electrode formed on the other surface of the substrate. In the noncontact IC module described in JP2007-310898A, the antenna section comprises an antenna coil having a helical pattern, and a conductor portion disposed in a spiral shape along an outer periphery of the antenna coil.

JP2009-271656A discloses an IC card that incorporates a resonance circuit having an antenna coil and a capacitor to perform communication in a noncontact manner by at least electromagnetic induction. The IC card described in JP2009-271656A has a card body, an IC chip that is incorporated in the card body, a capacitor for adjustment that is incorporated in the card body, is connected to the IC chip, and is configured to adjust a capacitance value of a capacitor, and a wiring section that is formed by connecting the IC chip and the capacitor for adjustment inside the card in at least an embossing region and is configured to be capable of being physically cut in the embossing region by embossing.

JP2006-217185A discloses an antenna circuit formed on an insulating substrate front surface. The antenna circuit described in JP2006-217185A has a wound planar antenna, a common connection pad connected to one end of the planar antenna, a plurality of individual connection pads, and wiring for inductance adjustment. A plurality of individual connection pads are disposed around the common connection pad to be separated at a predetermined interval from the common connection pad. Any one individual connection pad among a plurality of individual connection pads is connected to the other end of the planar antenna. The wiring for inductance adjustment is connected to intermediate terminal portions of the planar antenna and the individual connection pads other than the individual connection pad connected to the other end of the planar antenna among a plurality of individual connection pads.

SUMMARY

An embodiment according to the technique of the present disclosure provides a method for manufacturing a noncontact communication medium and a noncontact communication medium capable of easily matching a resonance frequency of a resonance circuit with a reference resonance frequency compared to a case where capacitance of an external capacitor is decided without taking into consideration a degree of difference between the reference resonance frequency and a temporary resonance frequency.

A first aspect according to the technique of the present disclosure is a method for manufacturing a noncontact communication medium including a processing circuit that is mounted on a substrate on which an antenna coil configured to induce power with application of a magnetic field from an outside is formed, and has an internal capacitor, and an external capacitor that is externally attached to the processing circuit and composes a resonance circuit configured to resonate at a predetermined resonance frequency with application of the magnetic field, along with the internal capacitor and the antenna coil, the processing circuit operating using power generated by the resonance circuit, the method comprising measuring a temporary resonance frequency in a state in which the external capacitor is not connected to the processing circuit and in a state in which the processing circuit is connected to the antenna coil, and deciding capacitance of the external capacitor based on a degree of difference between a reference resonance frequency in a case where the noncontact communication medium performs communication with the outside through the magnetic field and the temporary resonance frequency.

A second aspect according to the technique of the present disclosure is the method for manufacturing a noncontact communication medium according to the first aspect, further comprising forming the resonance circuit by mounting the external capacitor having the decided capacitance on the substrate.

A third aspect according to the technique of the present disclosure is the method for manufacturing a noncontact communication medium according to the second aspect, in which the resonance circuit is formed by connecting the external capacitor to the substrate by a surface mounting method.

A fourth aspect according to the technique of the present disclosure is the method for manufacturing a noncontact communication medium according to the second aspect or the third aspect, in which the external capacitor having the decided capacitance is mounted on the substrate after the processing circuit in a state of being connected to the antenna coil is sealed with a sealing material.

A fifth aspect according to the technique of the present disclosure is the method for manufacturing a noncontact communication medium according to any one of the first aspect to the fourth aspect, in which the temporary resonance frequency is measured after the processing circuit is connected to the antenna coil in a state in which the external capacitor is not connected to the processing circuit.

A sixth aspect according to the technique of the present disclosure is the method for manufacturing a noncontact communication medium according to any one of the first aspect to the fifth aspect, further comprising transmitting a signal indicating the temporary resonance frequency, and receiving the transmitted signal, in which the capacitance of the external capacitor is decided based on the temporary resonance frequency indicated by the received signal.

A seventh aspect according to the technique of the present disclosure is the method for manufacturing a noncontact communication medium according to any one of the first aspect to the sixth aspect, in which the processing circuit is formed in an IC chip.

An eighth aspect according to the technique of the present disclosure is the method for manufacturing a noncontact communication medium according to any one of the first aspect to the seventh aspect, in which the substrate is a flexible type substrate.

A ninth aspect according to the technique of the present disclosure is a noncontact communication medium comprising a processing circuit that is mounted on a substrate on which an antenna coil configured to induce power with application of a magnetic field from an outside is formed, and has an internal capacitor, and an external capacitor that is externally attached to the processing circuit and composes a resonance circuit configured to resonate at a predetermined resonance frequency with application of the magnetic field, along with the internal capacitor and the antenna coil, in which the processing circuit operates using power generated by the resonance circuit, and capacitance of the external capacitor is decided based on a degree of difference between a reference resonance frequency in a case where the noncontact communication medium performs communication with the outside through the magnetic field and a temporary resonance frequency measured in a state in which the external capacitor is not connected to the processing circuit and in a state in which the processing circuit is connected to the antenna coil.

A tenth aspect according to the technique of the present disclosure is the noncontact communication medium according to the ninth aspect, in which the processing circuit is formed in an IC chip.

An eleventh aspect according to the technique of the present disclosure is the noncontact communication medium according to the ninth aspect or the tenth aspect, in which the substrate is a flexible type substrate.

BRIEF DESCRIPTION OF THE DRAWINGS

Exemplary embodiments of the present invention will be described in detail based on the following figures, wherein:

FIG. 12 is an explanatory view showing an example of an operation of the capacitance decision unit according to the embodiment;

DETAILED DESCRIPTION

Figure 1:
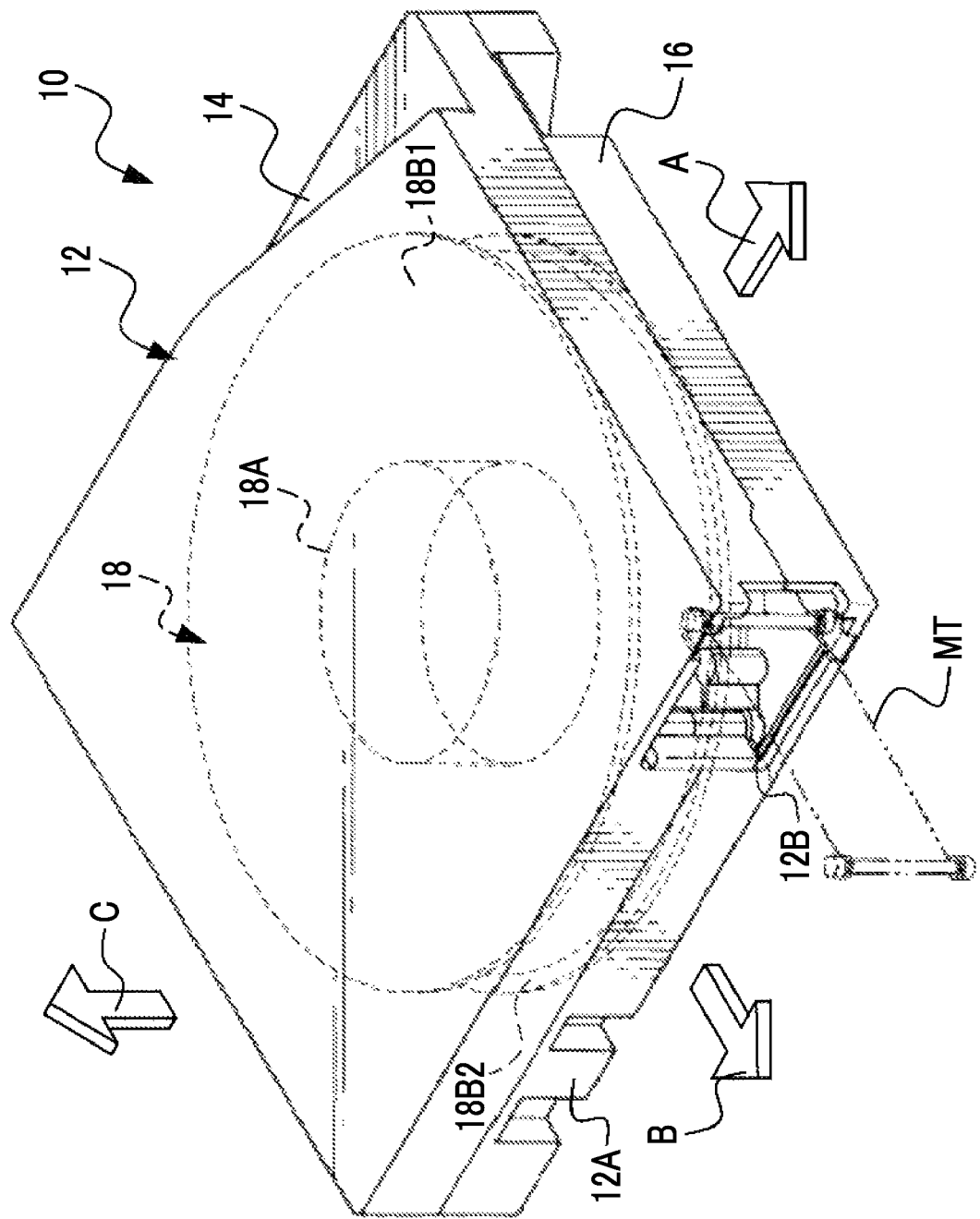
FIG. 1 is a schematic perspective view showing an example of the appearance of a magnetic tape cartridge according to an embodiment.

First, terms that are used in the following description will be described.

CPU is an abbreviation for "Central Processing Unit". RAM is an abbreviation for "Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". USB is an abbreviation for "Universal Serial Bus". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open". CM is an abbreviation for "Cartridge Memory".

In the following description, for convenience of description, in FIG. 1, a loading direction of a magnetic tape cartridge 10 on a magnetic tape drive 30 (see FIG. 4) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description on the structure, "front" indicates the front side of the magnetic tape cartridge 10.

In the following description, for convenience of description, in FIG. 1, a direction of an arrow B perpendicular to the direction of the arrow A is referred to as a right direction, and a side in the right direction of the magnetic tape cartridge 10 is referred to as a right side of the magnetic tape cartridge 10. In the following description on the structure, "right" indicates the right side of the magnetic tape cartridge 10.

In the following description, for convenience of description, in FIG. 1, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10.

In the following description on the structure, "upper" indicates the upper side of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description on the structure, "rear" indicates the rear side of the magnetic tape cartridge 10.

In the following description, for convenience of description, in FIG. 1, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description on the structure, "lower" indicates the lower side of the magnetic tape cartridge 10.

In the following description, LTO will be described as an example of the standard of the magnetic tape cartridge 10. In the following description, although description will be provided on an assumption that the specification shown in Table 1 described below is applied to LTO according to the technique of the present disclosure, this is merely an example, and LTO according to the technique of the present disclosure may conform to the specification of IBM3592 magnetic tape cartridge.

TABLE 1

| Communication Command Classification | ISO14443 Standard | LTO Specification |
|---|---|---|
| REQA to SELECT Series | 86 or 91 μs | 86 or 91 μs ("1172/13.56 (MHz)" or "1236/13.56 (MHz)") |
| READ Series | Unspecified | 86 or 91 μs ("1172/13.56 (MHz)" or "1236/13.56 (MHz)") |
| WRITE Series | Unspecified | about 10.02 ms ("135828/13.56 (MHz)" or "135892/13.56 (MHz)") |

In Table 1, "REQA to SELECT Series" means a polling command described below. In "REQA to SELECT Series", at least a "Request A" command, a "Request SN" command, and a "Select" command are included. "Request A" is a command that inquires a cartridge memory about what type of cartridge memory is. In the embodiment, "Request A" is one kind; however, the technique of the present disclosure is not limited thereto, and "Request A" may be a plurality of kinds. "Request SN" is a command that inquires the cartridge memory about a serial number. "Select" is a command that notifies the cartridge memory beforehand of preparation of reading and writing. READ Series is a command corresponding to a read-out command described below. WRITE Series is a command corresponding to a write-in command described below.

As shown in FIG. 1 as an example, the magnetic tape cartridge 10 has a substantially rectangular shape in plan view, and comprises a box-shaped case 12. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably housed. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion in a width direction of the magnetic tape MT is held by the upper flange 18B1 and the lower flange 18B2. The reel hub 18A and the lower flange 18B2 may be molded integrally.

An opening 12B is formed on a front side of a right wall 12A of the case 12. The magnetic tape MT is pulled out from the opening 12B.

Figure 2:
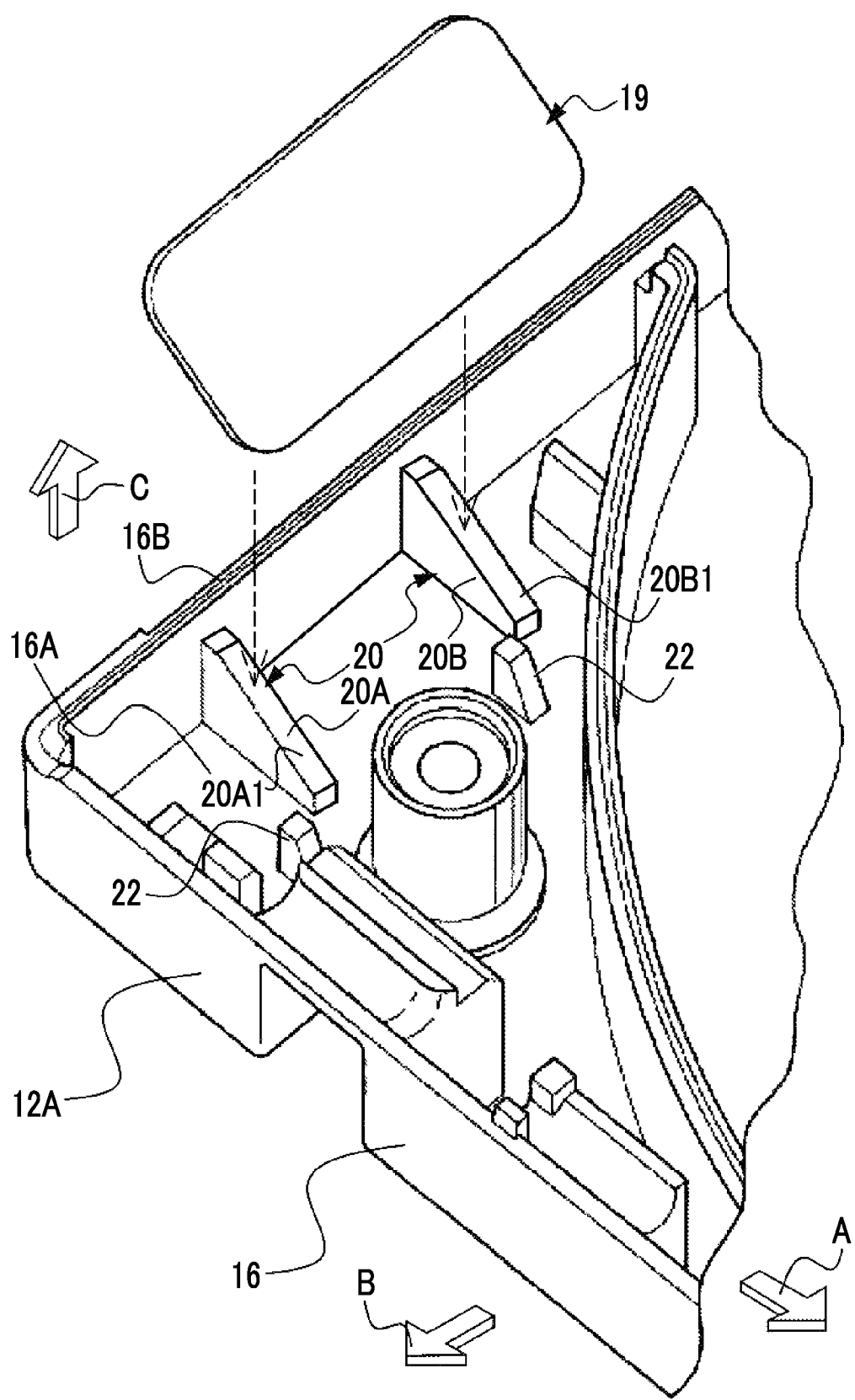
FIG. 2 is a schematic perspective view showing an example of the structure of a rear right end portion inside a lower case of the magnetic tape cartridge according to the embodiment.

As shown in FIG. 2 as an example, a cartridge memory 19 is housed in a rear right end portion of the lower case 16. The cartridge memory 19 is an example of a "noncontact communication medium" according to the technique of the present disclosure. In the embodiment, a so-called passive type RFID tag is employed as the cartridge memory 19.

Management information is stored in the cartridge memory 19. The management information is information for managing the magnetic tape cartridge 10. Examples of the management information include identification information capable of specifying the magnetic tape cartridge 10, a recording capacity of the magnetic tape MT, the outline of information (hereinafter, referred to as "recorded information") recorded on the magnetic tape MT, items of the recorded information, and information indicating a recording format of the recorded information.

The cartridge memory 19 performs communication with an external device (not shown) in a noncontact manner. Examples of the external device include a reading and writing device that is used in a production process of the magnetic tape cartridge 10 and a reading and writing device (for example, a noncontact reading and writing device 50 shown in FIGS. 4 to 6) that is used in a magnetic tape drive (for example, the magnetic tape drive 30 shown in FIG. 4).

The external device performs reading and writing of various kinds of information to the cartridge memory 19 in a noncontact manner. Although details will be described below, the cartridge memory 19 generates power with electromagnetic application to a magnetic field from the external device. Then, the cartridge memory 19 operates using the generated power and performs transfer of various kinds of information with the external device by performing communication with the external device through the magnetic field. A communication system may be, for example, a system conforming to a known standard, such as ISO14443 or ISO18092, or may be a system conforming to the LTO Specification of ECMA319.

As shown in FIG. 2 as an example, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are modularized in an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. An inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 3:
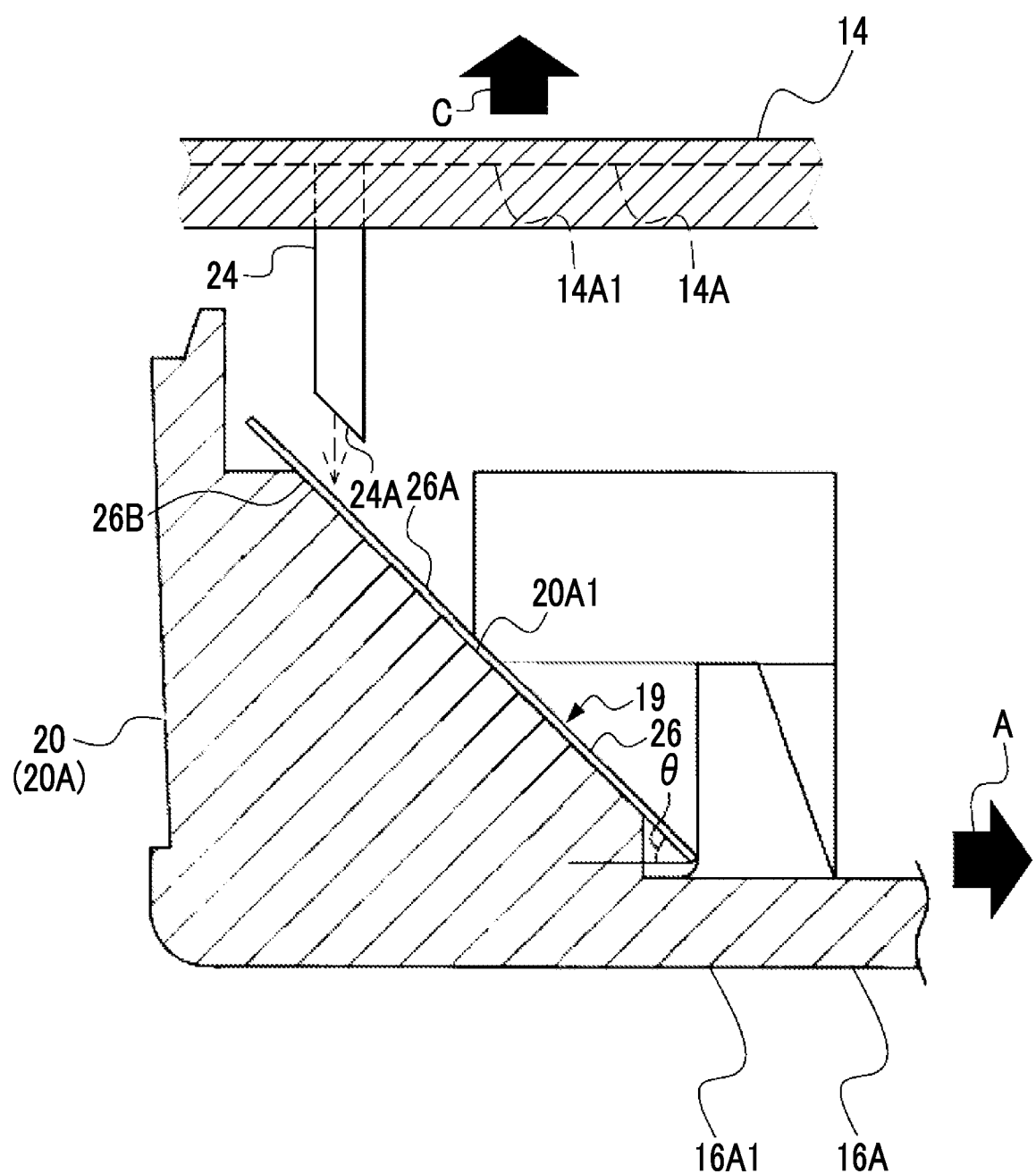
FIG. 3 is a side cross-sectional view showing an example of a support member provided on an inner surface of the lower case of the magnetic tape cartridge according to the embodiment.

As shown in FIG. 3 as an example, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side. An inclination angle $\theta$ of the support member 20, that is, an inclination angle of each of the inclined surface 20A1 and the inclined surface 20B1 is 45 degrees with respect to the reference surface 16A1. The inclination angle of 45 degrees is merely an example, and may be in a range of "0 degrees<inclination angle $\theta$<45 degrees" or may be equal to or greater than 45 degrees.

The cartridge memory 19 comprises a substrate 26. The substrate 26 is an example of a "substrate" according to the technique of the present disclosure. The substrate 26 is a flexible type substrate and has a substantially rectangular flat plate shape. The substrate 26 has two surfaces in a thickness direction, that is, a front surface 26A and a back surface 26B. The substrate 26 is placed on the support member 20 such that the back surface 26B of the substrate 26 turns toward a lower side, and the support member 20 supports the back surface 26B of the substrate 26 from below. A part of the back surface 26B of the substrate 26 is in contact with the inclined surface of the support member 20, that is, the inclined surfaces 20A1 and 20B1, and the front surface 26A of the substrate 26 is exposed to an inner surface 14A1 side of a top plate 14A.

The upper case 14 comprises a plurality of ribs 24. A plurality of ribs 24 are disposed at intervals in the right-left direction of the case 12. A plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1. That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26A side, and the substrate 26 is pinched by the distal end surface 24A of each rib 24 and the inclined surface of the support member 20. With this, a position in an up-down direction of the cartridge memory 19 is restricted by the ribs 24.

Figure 4:
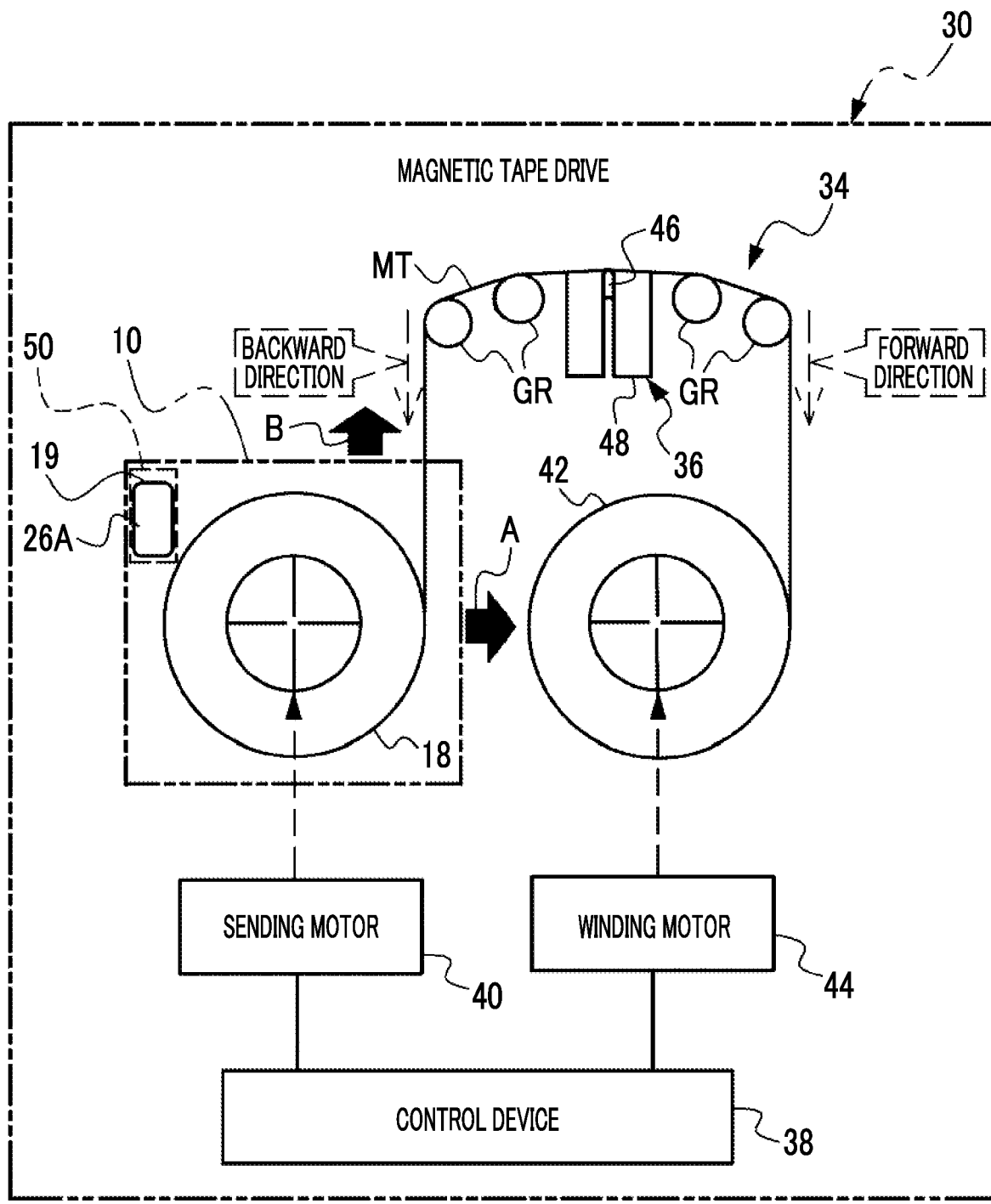
FIG. 4 is a schematic configuration diagram showing an example of the hardware configuration of the magnetic tape drive according to the embodiment.

As shown in FIG. 4 as an example, the magnetic tape drive 30 comprises a transport device 34, a reading head 36, and a control device 38. The magnetic tape cartridge 10 is loaded into the magnetic tape drive 30. The magnetic tape drive 30 is a device that pulls out the magnetic tape MT from the magnetic tape cartridge 10 and reads recorded information from the pulled-out magnetic tape MT using the reading head 36 by a linear serpentine method. In the embodiment, in order words, reading of the recorded information indicates reproduction of the recorded information.

The control device 38 controls the entire magnetic tape drive 30. In the embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an ASIC, an FPGA, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38.

The sending motor 40 rotationally drives the cartridge reel 18 in the magnetic tape cartridge 10 under the control of the control device 38. The control device 38 controls the sending motor 40 to control a rotation direction, a rotation speed, rotation torque, and the like of the cartridge reel 18.

The winding motor 44 rotationally drives the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the sending motor 40 and the winding motor 44 are rotated by the control device 38 such that the magnetic tape MT runs in the forward direction. Rotation speeds, rotation torque, and the like of the sending motor 40 and the winding motor 44 are adjusted depending on a speed of the magnetic tape MT wound around the winding reel 42.

In a case where the magnetic tape MT is rewound to the cartridge reel 18, the sending motor 40 and the winding motor 44 are rotated by the control device 38 such that the magnetic tape MT runs in the backward direction. Rotation speeds, rotation torque, and the like of the sending motor 40 and the winding motor 44 are adjusted depending on a speed of the magnetic tape MT wound around the winding reel 42.

The rotation speed, the rotation torque, and the like of each of the sending motor 40 and the winding motor 44 are adjusted in this manner, whereby tension in a predetermined range is applied to the magnetic tape MT. Here, the predetermined range indicates, for example, a range of tension obtained from a computer simulation or a test with a real machine as a range of tension in which data can be read from the magnetic tape MT by the reading head 36.

In the embodiment, although the rotation speed, the rotation torque, and the like of each of the sending motor 40 and the winding motor 44 are controlled such that the tension of the magnetic tape MT is controlled, the technique of the present disclosure is not limited thereto. For example, the tension of the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the reading head 36 between the magnetic tape cartridge 10 and the winding reel 42.

The reading head 36 comprises a reading element 46 and a holder 48. The reading element 46 is held by the holder 48 to come into contact with the magnetic tape MT during running, and reads recorded information from the magnetic tape MT transported by the transport device 34.

The magnetic tape drive 30 comprises the noncontact reading and writing device 50. The noncontact reading and writing device 50 is an example of an "outside" according to the technique of the present disclosure. The noncontact reading and writing device 50 is disposed to confront the back surface 26B of the cartridge memory 19 below the magnetic tape cartridge 10 in a state in which the magnetic tape cartridge 10 is loaded. The state in which the magnetic tape cartridge 10 is loaded into the magnetic tape drive 30 indicates, for example, a state in which the magnetic tape cartridge 10 reaches a position determined in advance as a position where reading of recorded information from the magnetic tape MT by the reading head 36 starts.

Figure 5:
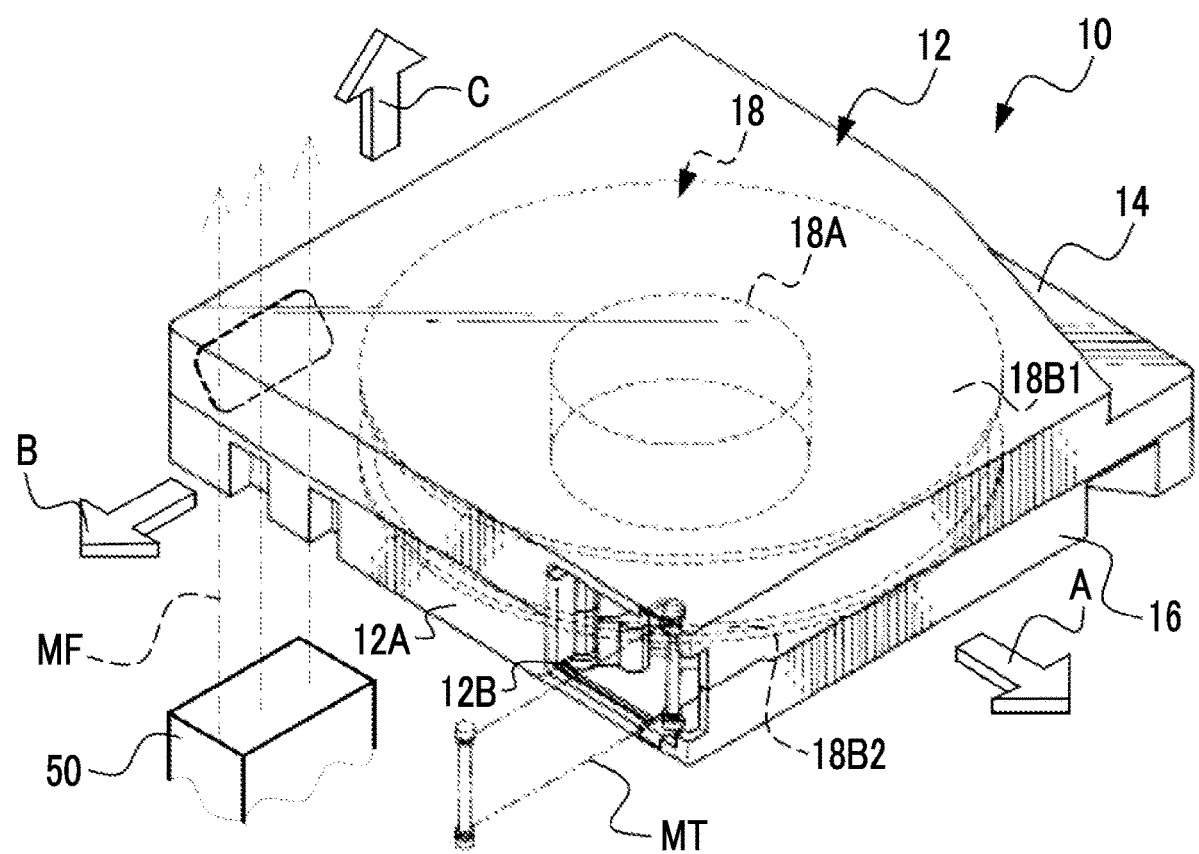
FIG. 5 is a schematic perspective view showing an example of an aspect in which a magnetic field is discharged from a lower side of the magnetic tape cartridge according to the embodiment by a noncontact reading and writing device.

As shown in FIG. 5 as an example, the noncontact reading and writing device 50 emits a magnetic field MF from below the magnetic tape cartridge 10 toward the cartridge memory 19. The magnetic field MF passes through the cartridge memory 19. The magnetic field MF is an example of a "magnetic field" according to the technique of the present disclosure.

Figure 6:
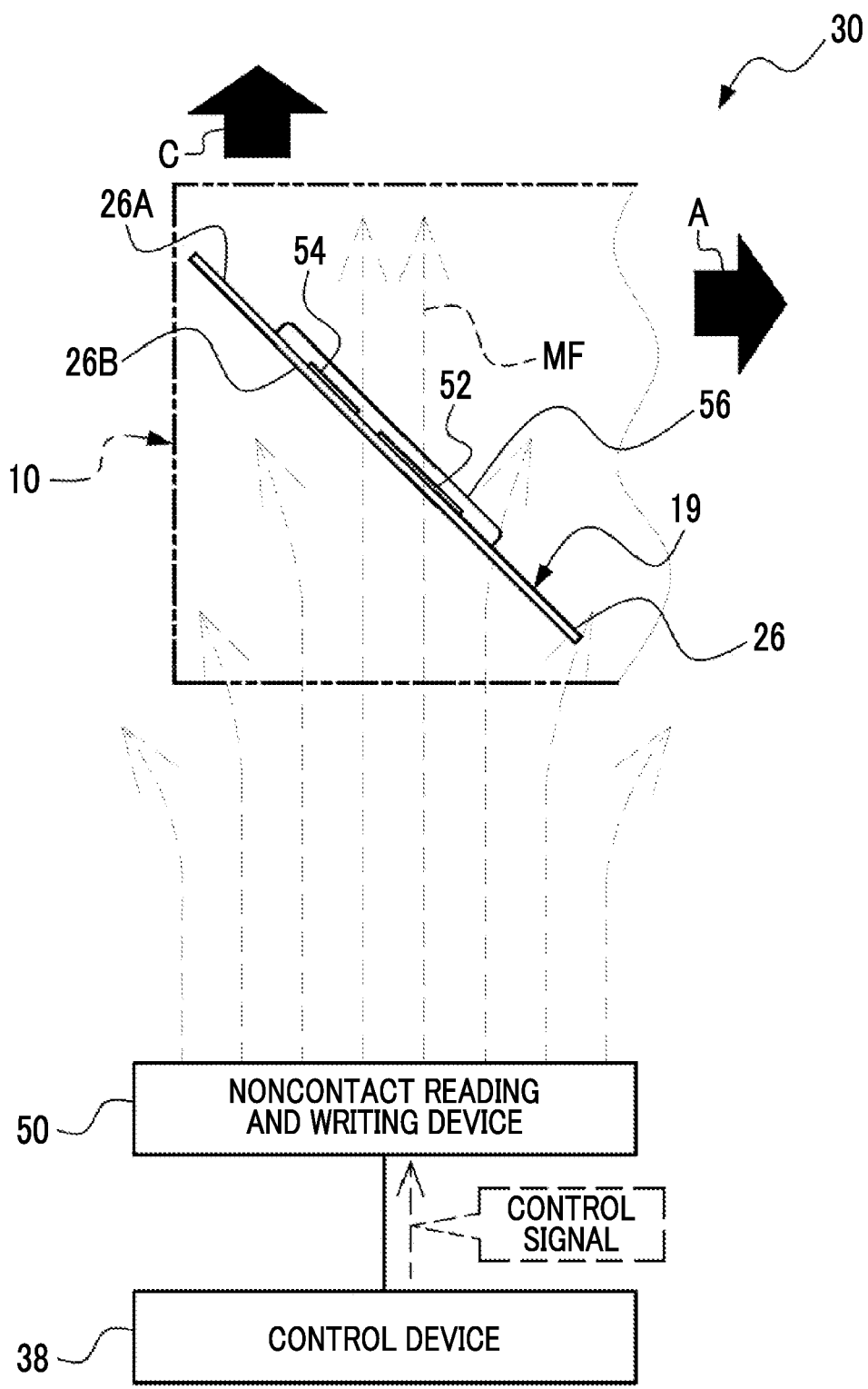
FIG. 6 is a conceptual diagram showing an example of an aspect in which a magnetic field is applied from the noncontact reading and writing device to a cartridge memory in the magnetic tape cartridge according to the embodiment.

As shown in FIG. 6 as an example, the noncontact reading and writing device 50 is connected to the control device 38. The control device 38 outputs a control signal for controlling the cartridge memory 19 to the noncontact reading and writing device 50. The noncontact reading and writing device 50 emits the magnetic field MF toward the cartridge memory 19 in compliance with the control signal input from the control device 38. The magnetic field MF passes through the cartridge memory 19 from the back surface 26B side to the front surface 26A side.

The noncontact reading and writing device 50 spatially transmits a command signal to the cartridge memory 19 under the control of the control device 38. Though described below in detail, the command signal is a signal indicating a command to the cartridge memory 19. In a case where the command signal is spatially transmitted from the noncontact reading and writing device 50 to the cartridge memory 19, the command signal is included in the magnetic field MF in compliance with an instruction from the control device 38 by the noncontact reading and writing device 50. In other words, the command signal is superimposed on the magnetic field MF. That is, the noncontact reading and writing device 50 transmits the command signal to the cartridge memory 19 through the magnetic field MF under the control of the control device 38.

An IC chip 52 and an external capacitor 54 are mounted on the front surface 26A of the cartridge memory 19. The IC chip 52 and the external capacitor 54 are adhered to the front surface 26A. The IC chip 52 and the external capacitor 54 are sealed with a sealing material 56 on the front surface 26A of the cartridge memory 19. Here, as the sealing material 56, ultraviolet curable resin that is cured by ultraviolet rays is employed. The ultraviolet curable resin is merely an example, and photocurable resin that is cured by light in a wavelength range other than ultraviolet rays may be used as the sealing material 56, thermosetting resin may be used as the sealing material 56, or an adhesive may be used as the sealing material 56. The IC chip 52 is an example of a "processing circuit" according to the technique of the present disclosure. The external capacitor 54 is an example of an "external capacitor" according to the technique of the present disclosure. The sealing material 56 is an example of a "sealing material" according to the technique of the present disclosure.

Figure 7:
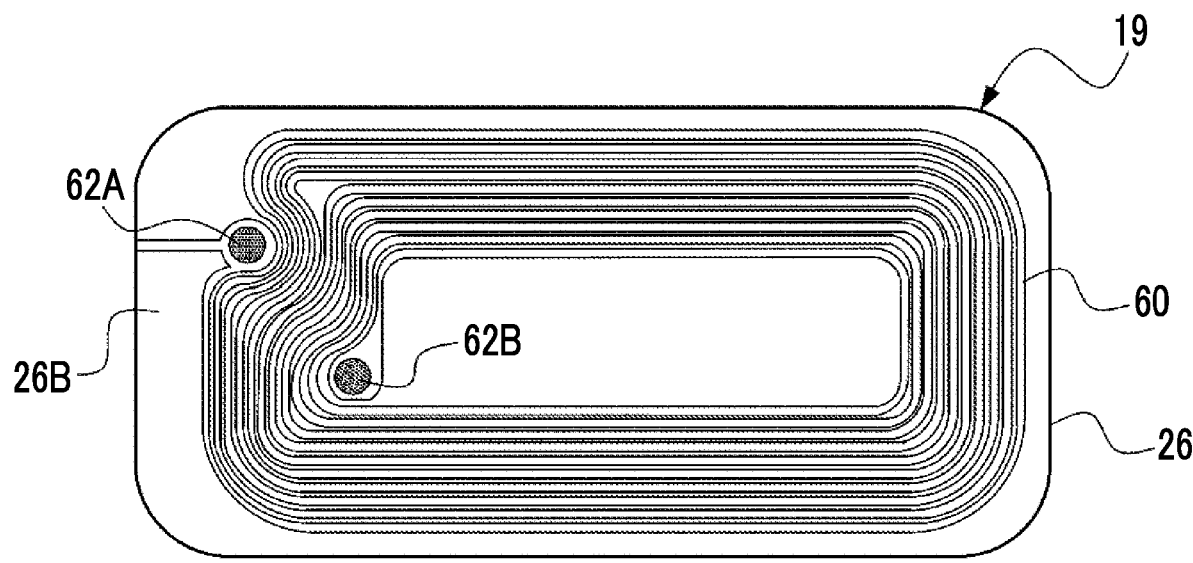
FIG. 7 is a bottom view showing an example of a back surface structure of the cartridge memory according to the embodiment.

As shown in FIG. 7 as an example, a coil 60 is formed in a loop shape on the back surface 26B of the cartridge memory 19. Here, as a material of the coil 60, copper foil is employed. The copper foil is merely an example, and for example, other kinds of conductive materials, such as aluminum foil, may be used. The coil 60 induces an induced current with application of the magnetic field MF (see FIGS. 5 and 6) from the noncontact reading and writing device 50. The coil 60 is an example of an "antenna coil" according to the technique of the present disclosure.

A first conduction portion 62A and a second conduction portion 62B are provided on the back surface 26B of the cartridge memory 19. The first conduction portion 62A and the second conduction portion 62B have solder and electrically connect both end portions of the coil 60 to the IC chip 52 (see FIGS. 6 and 8) and the external capacitor 54 (see FIGS. 6 and 8) on the front surface 26A.

Figure 8:
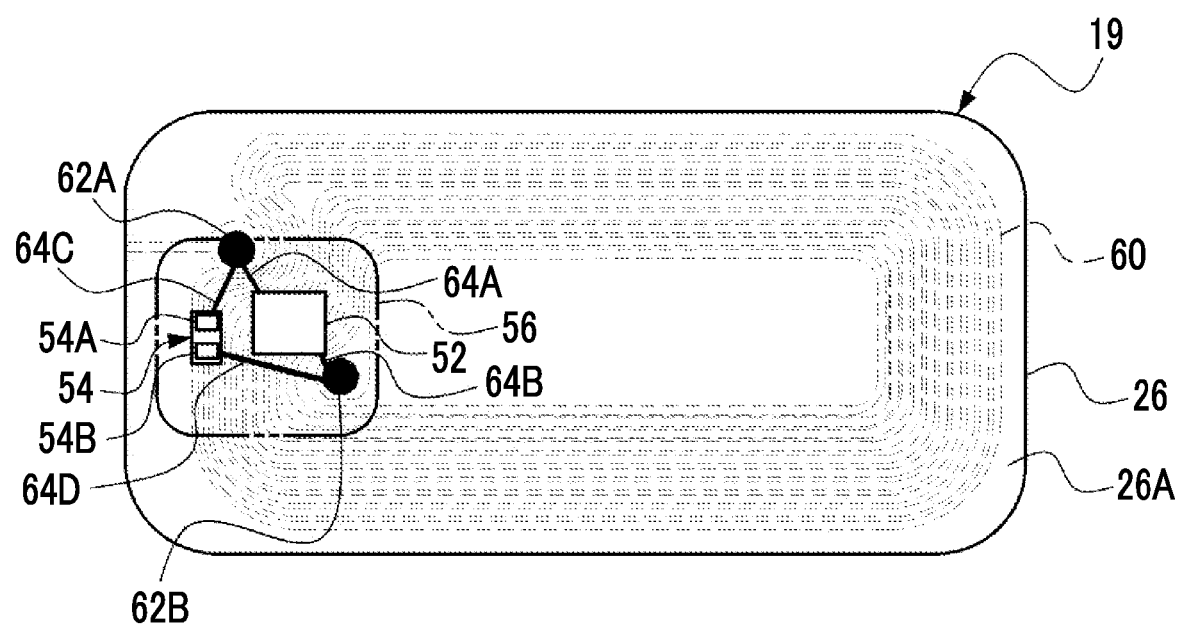
FIG. 8 is a top view showing an example of a front surface structure of the cartridge memory according to the embodiment.

As shown in FIG. 8 as an example, on the front surface 26A of the cartridge memory 19, the IC chip 52 and the external capacitor 54 are electrically connected to each other using a wire connection method. Specifically, one terminal of a positive electrode terminal and a negative electrode terminal of the IC chip 52 is connected to the first conduction portion 62A through a wire 64A, and the other terminal is connected to the second conduction portion 62B through a wire 64B. The external capacitor 54 has a pair of electrodes. In the example shown in FIG. 8, a pair of electrodes is electrodes 54A and 54B. The electrode 54A is connected to the first conduction portion 62A through a wire 64C, and the electrode 54B is connected to the second conduction portion 62B through a wire 64D. With this, the IC chip 52 and the external capacitor 54 are connected in parallel with the coil 60.

Figure 9:
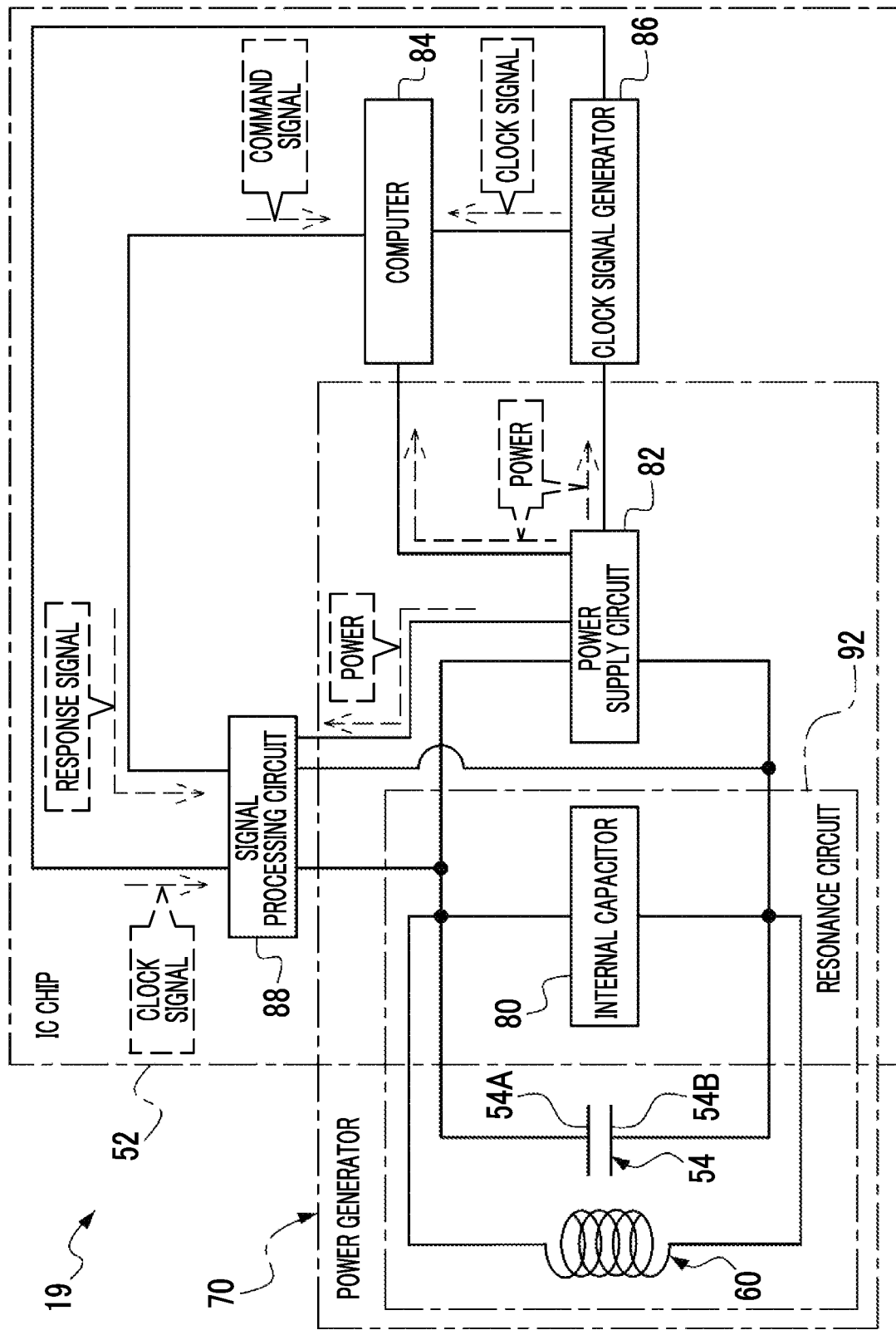
FIG. 9 is a schematic circuit diagram showing an example of the circuit configuration of the cartridge memory according to the embodiment.

As shown in FIG. 9 as an example, the IC chip 52 comprises an internal capacitor 80, a power supply circuit 82, a computer 84, a clock signal generator 86, and a signal processing circuit 88. The IC chip 52 is a general-use IC chip that is usable for purposes other than the magnetic tape cartridge 10, and functions as an arithmetic device for a magnetic tape cartridge in a case where a program for a magnetic tape cartridge is installed thereon. The internal capacitor 80 is an example of an "internal capacitor" according to the technique of the present disclosure.

The cartridge memory 19 comprises a power generator 70. The power generator 70 generates power with application of the magnetic field MF from the noncontact reading and writing device 50 to the coil 60. Specifically, the power generator 70 generates alternating-current power using a resonance circuit 92, converts the generated alternating-current power into direct-current power, and outputs the direct-current power. The resonance circuit 92 is an example of a "resonance circuit" according to the technique of the present disclosure.

The power generator 70 has the resonance circuit 92 and the power supply circuit 82. The resonance circuit 92 comprises the external capacitor 54, the coil 60, and the internal capacitor 80. The internal capacitor 80 is a capacitor incorporated in the IC chip 52, and the power supply circuit 82 is also a circuit incorporated in the IC chip 52. The internal capacitor 80 is connected in parallel with the coil 60. The internal capacitor 80 is connected in parallel with the external capacitor 54.

The external capacitor 54 is a capacitor externally attached to the IC chip 52. The IC chip 52 is a general-use IC chip that is intrinsically usable for purposes different from the magnetic tape cartridge 10. For this reason, the capacitance of the internal capacitor 80 may not be enough to realize a resonance frequency required for the cartridge memory 19 used in the magnetic tape cartridge 10. Accordingly, in the cartridge memory 19, the external capacitor 54 is post-attached to the IC chip 52 as a capacitor having capacitance necessary in making the resonance circuit 92 resonate at a predetermined resonance frequency with the application of the magnetic field MF. The capacitance of the external capacitor 54 is decided by a resonance circuit forming system 120 (see FIG. 10) described below. A frequency corresponding to the predetermined resonance frequency is, for example, 13.56 MHz, and may be appropriately decided depending on the specification or the like of the cartridge memory 19 and/or the noncontact reading and writing device 50. 13.56 MHz is an example of a "predetermined resonance frequency" according to the technique of the present disclosure.

The power supply circuit 82 has a rectification circuit, a smoothing circuit, and the like. The rectification circuit is a full-wave rectification circuit having a plurality of diodes. The full-wave rectification circuit is merely an example, and a half-wave rectification circuit may be used. The smoothing circuit includes a capacitor and a resistor. The power supply circuit 82 converts the alternating-current power input from the resonance circuit 92 into direct-current power and supplies the converted direct-current power (hereinafter, simply referred to as "power") to various drive elements in the IC chip 52. Examples of various drive elements include the computer 84, the clock signal generator 86, and the signal processing circuit 88. In this way, power is supplied to various drive elements in the IC chip 52 by the power generator 70, whereby the IC chip 52 operates using power generated by the power generator 70.

The computer 84 comprises a CPU, an NVM, and a RAM (all are not shown). The program for a magnetic tape cartridge and the management information are stored in the NVM. The CPU controls the operation of the cartridge memory 19 by reading the program from the NVM and executing the program on the RAM.

The CPU selectively executes polling processing, read-out processing, and write-in processing in response to the command signal input from the signal processing circuit 88. The polling processing is processing of establishing communication between the cartridge memory 19 and the noncontact reading and writing device 50, and is executed, for example, as preparation processing in a pre-stage of the read-out processing and the write-in processing. The read-out processing is processing of reading out the management information and the like from the NVM. The write-in processing is processing of writing the management information and the like in the NVM. All of the polling processing, the read-out processing, and the write-in processing (hereinafter, referred to as various kinds of processing in a case where there is no need for distinction) are executed by the CPU in association with the clock signals generated by the clock signal generator 86. That is, the CPU executes various kinds of processing at a processing speed corresponding to the clock frequency.

The clock signal generator 86 generates a clock signal and outputs the clock signal to the computer 84. The computer 84 operates in association with the clock signal input from the clock signal generator 86.

The signal processing circuit 88 is connected to the resonance circuit 92. The signal processing circuit 88 has a decoding circuit and an encoding circuit (both are not shown). The decoding circuit of the signal processing circuit 88 extracts and decodes a command signal from the magnetic field MF received by the coil 60 and outputs the command signal to the computer 84. The computer 84 outputs a response signal to the command signal to the signal processing circuit 88. That is, the computer 84 executes processing according to the command signal input from the signal processing circuit 88 and outputs a processing result as a response signal to the signal processing circuit 88. In the signal processing circuit 88, in a case where the response signal is input from the computer 84, the encoding circuit of the signal processing circuit 88 encodes the response signal to modulate the response signal and outputs the response signal to the resonance circuit 92. The resonance circuit 92 transmits the response signal input from the encoding circuit of the signal processing circuit 88 to the noncontact reading and writing device 50 through the magnetic field MF. That is, in a case where the response signal is transmitted from the cartridge memory 19 to the noncontact reading and writing device 50, the response signal is included in the magnetic field MF. In other words, the response signal is superimposed on the magnetic field MF.

Figure 10:
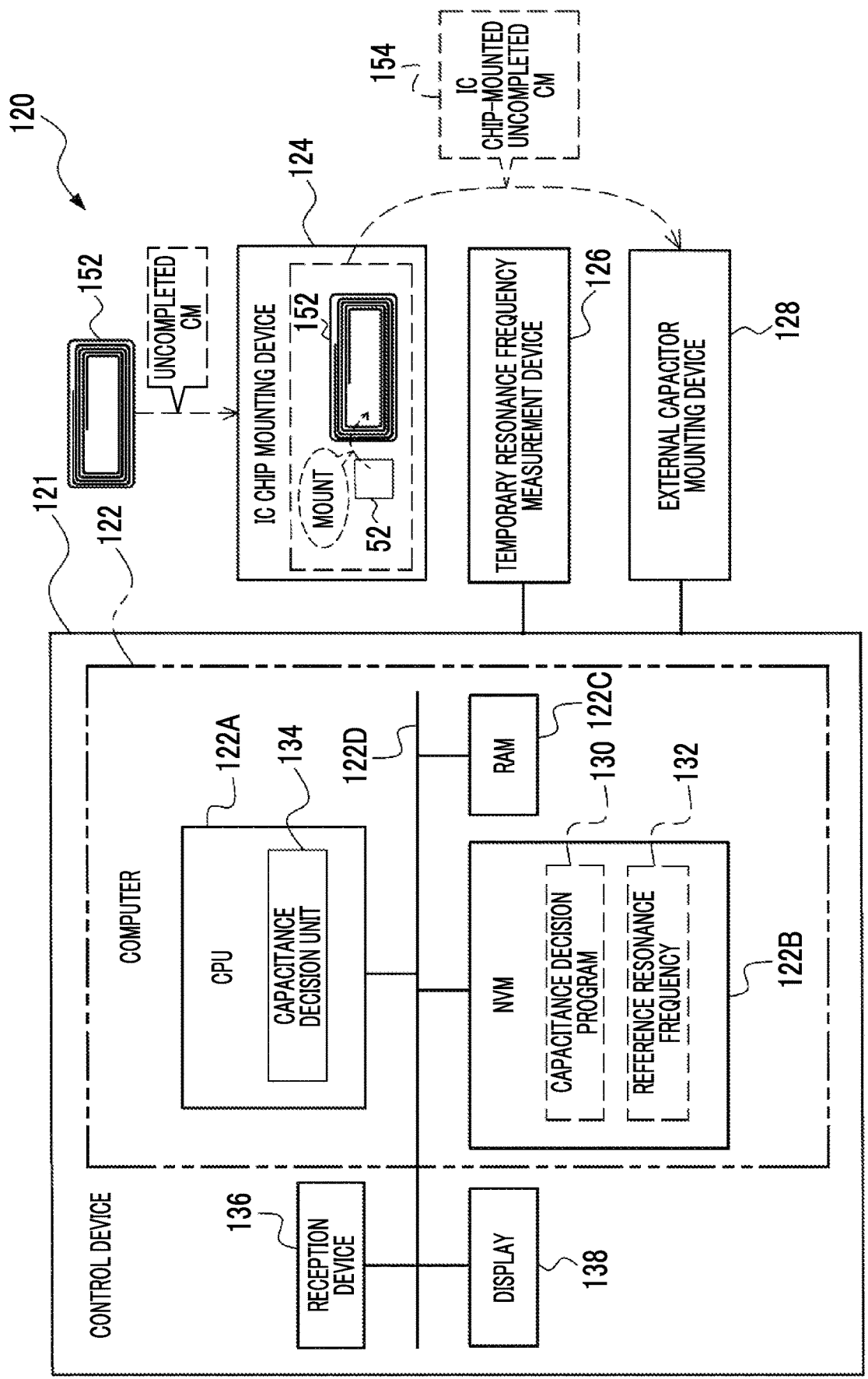
FIG. 10 is a block diagram showing an example of a resonance circuit forming system according to the embodiment.

The resonance circuit forming system 120 shown in FIG. 10 as an example is a system that forms the resonance circuit 92 by mounting the IC chip 52 and the external capacitor 54 on the substrate 26 on which the coil 60 is formed. The resonance circuit forming system 120 is introduced into a manufacturing line of the cartridge memory 19, for example.

As shown in FIG. 10 as an example, the resonance circuit forming system 120 comprises an IC chip mounting device 124, a temporary resonance frequency measurement device 126, an external capacitor mounting device 128, and a control device 121.

The IC chip mounting device 124 forms an IC chip-mounted uncompleted cartridge memory (hereinafter, referred to as an "IC chip-mounted uncompleted CM") 154 by connecting the IC chip 52 to a coil 60 of an uncompleted cartridge memory (hereinafter, referred to as an "uncompleted CM") 152 through an operation of a worker in the manufacturing line. The uncompleted CM 152 is a cartridge memory under manufacturing in a state in which the coil 60 is formed on the substrate 26, and both the IC chip 52 and the external capacitor 54 are not mounted. The IC chip-mounted uncompleted CM 154 is a cartridge memory under manufacturing in a state in which the IC chip 52 is mounted on the substrate 26 on which the coil 60 is formed, and the external capacitor 54 is not mounted. With this, a temporary resonance circuit 148 (see FIG. 12) that is a resonance circuit including the internal capacitor 80 and the coil 60 while not including the external capacitor 54 is formed. The IC chip mounting device 124 seals the IC chip 52 connected to the substrate 26 with the sealing material 56.

The temporary resonance frequency measurement device 126 is, for example, a device that comprises an impedance analyzer and measures a resonance frequency of a resonance circuit. The external capacitor mounting device 128 is a device that bonds and connects the external capacitor 54 to the substrate 26. The temporary resonance frequency measurement device 126 and the external capacitor mounting device 128 are connected to the control device 121 through a cable.

The control device 121 comprises a computer 122, a reception device 136, and a display 138. The computer 122 comprises a CPU 122A, an NVM 122B, and a RAM 122C, and the CPU 122A, the NVM 122B, and the RAM 122C are connected through a bus 122D. In the example shown in FIG. 10, although one bus is shown as the bus 122D for convenience of illustration, a plurality of buses may be employed. The bus 122D may include a serial bus or a parallel bus composed of a data bus, an address bus, a control bus, and the like. The reception device 136 receives an instruction from a manager who manages the resonance circuit forming system 120. The display 138 displays various kinds of information. The reception device 136 and the display 138 are connected to the computer 122 through the bus 122D.

The NVM 122B stores a capacitance decision program 130 and a reference resonance frequency 132. Here, although an EEPROM, an SSD, or an HDD is employed as an example of the NVM 122B, the technique of the present disclosure is not limited thereto, and a combination of a plurality of nonvolatile storage devices may be employed. The RAM 122C temporarily stores various kinds of information. The RAM 122C is used as a work memory by the CPU 122A.

The CPU 122A reads the capacitance decision program 130 from the NVM 122B and executes the read capacitance decision program 130 on the RAM 122C. The CPU 122A operates as a capacitance decision unit 134 in association with the capacitance decision program 130 executed on the RAM 122C, thereby executing capacitance decision processing of deciding the capacitance of the external capacitor 54.

The capacitance decision unit 134 executes the capacitance decision processing in a case where an execution instruction is received from the reception device 136. The execution instruction is input from the reception device 136 by the worker, for example.

Figure 11:
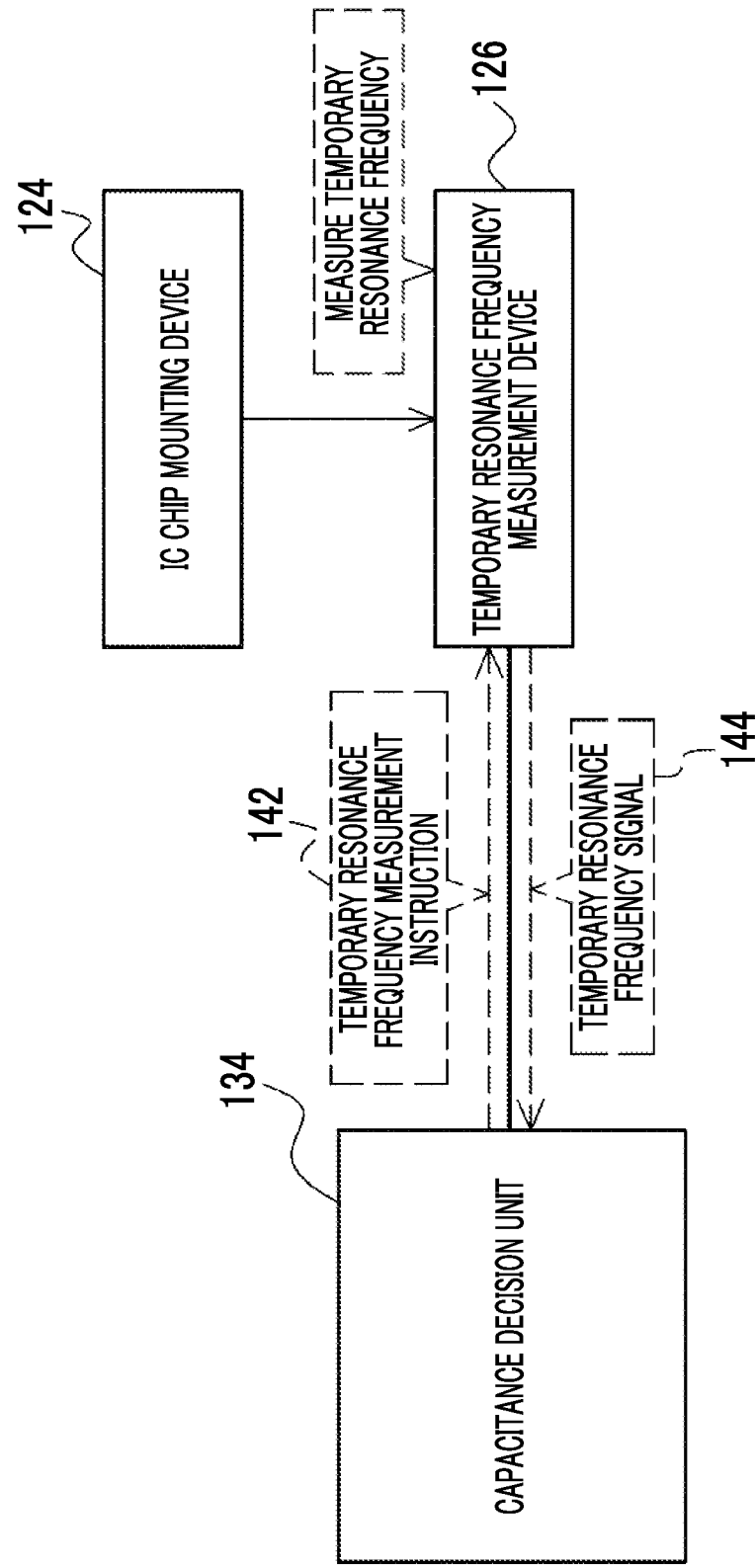
FIG. 11 is an explanatory view showing an example of an operation of a capacitance decision unit according to the embodiment.

As shown in FIG. 11 as an example, in the capacitance decision processing, the capacitance decision unit 134 makes the temporary resonance frequency measurement device 126 measure a temporary resonance frequency 150 (see FIG. 12) that is a resonance frequency of the temporary resonance circuit 148, by outputting a temporary resonance frequency measurement instruction 142 to the temporary resonance frequency measurement device 126. The capacitance decision unit 134 makes the temporary resonance frequency measurement device 126 transmit a temporary resonance frequency signal 144 indicating the measured temporary resonance frequency 150 to the capacitance decision unit 134. The temporary resonance frequency 150 is an example of a "temporary resonance frequency" according to the technique of the present disclosure. The temporary resonance frequency signal 144 is an example of a "signal" according to the technique of the present disclosure.

As shown in FIG. 12 as an example, the capacitance decision unit 134 receives the temporary resonance frequency signal 144 transmitted from the temporary resonance frequency measurement device 126. The capacitance decision unit 134 reads the reference resonance frequency 132 from the NVM 122B and decides the capacitance of the external capacitor 54 based on a degree of difference between the temporary resonance frequency 150 included in the received temporary resonance frequency signal 144 and the reference resonance frequency 132. The reference resonance frequency 132 is an example of a "reference resonance frequency" according to the technique of the present disclosure. The reference resonance frequency 132 is a frequency determined in advance as a frequency in a case where the cartridge memory 19 performs communication with the noncontact reading and writing device 50 through the magnetic field MF, and is, for example, 13.56 MHz.

The degree of difference used in the capacitance decision unit 134 is, for example, the difference between the temporary resonance frequency 150 and the reference resonance frequency 132. The difference is merely an example, and for example, a ratio of one resonance frequency of the temporary resonance frequency 150 and the reference resonance frequency 132 to the other resonance frequency may be employed or a value capable of specifying how much the temporary resonance frequency 150 deviates from the reference resonance frequency 132 may be employed.

Figure 13:
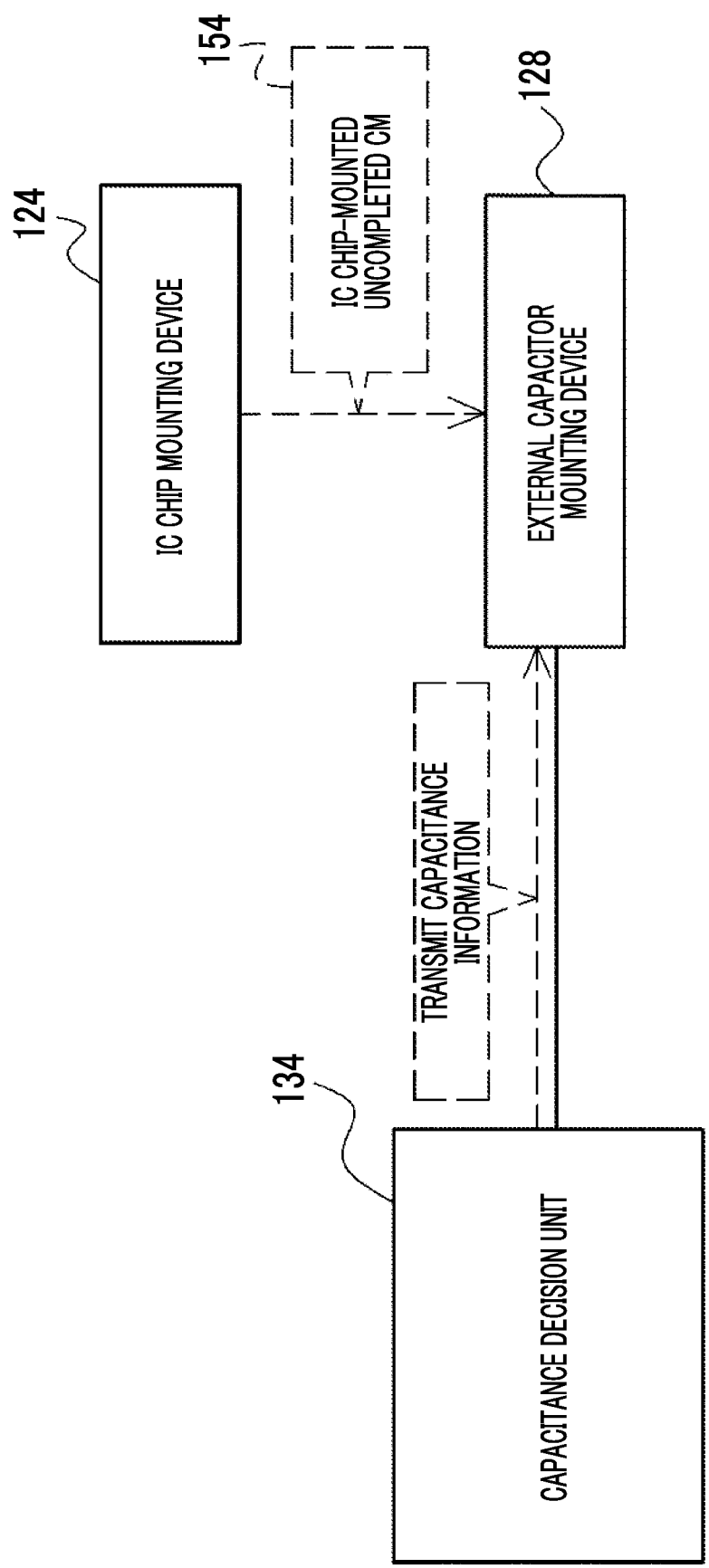
FIG. 13 is an explanatory view showing an example of an operation of the capacitance decision unit according to the embodiment.

As shown in FIG. 13 as an example, the capacitance decision unit 134 transmits capacitance information that is information relating to the decided capacitance, to the external capacitor mounting device 128. The external capacitor mounting device 128 receives the capacitance information transmitted from the capacitance decision unit 134. The external capacitor mounting device 128 acquires the IC chip-mounted uncompleted CM 154 from the IC chip mounting device 124 and mounts the external capacitor 54 having the capacitance indicated by the capacitance information on the IC chip-mounted uncompleted CM 154 by a surface mounting method. Specifically, a plurality of kinds of capacitors having different capacitance are prepared in advance in the manufacturing line, and the external capacitor mounting device 128 mounts a capacitor having capacitance closest to the decided capacitance among a plurality of kinds of capacitors on the IC chip-mounted uncompleted CM 154 as the external capacitor 54. With this, the resonance circuit 92 having the reference resonance frequency 132 is formed.

Next, the operations of the resonance circuit forming system 120 according to the embodiment will be described referring to FIG. 14.

Figure 14:
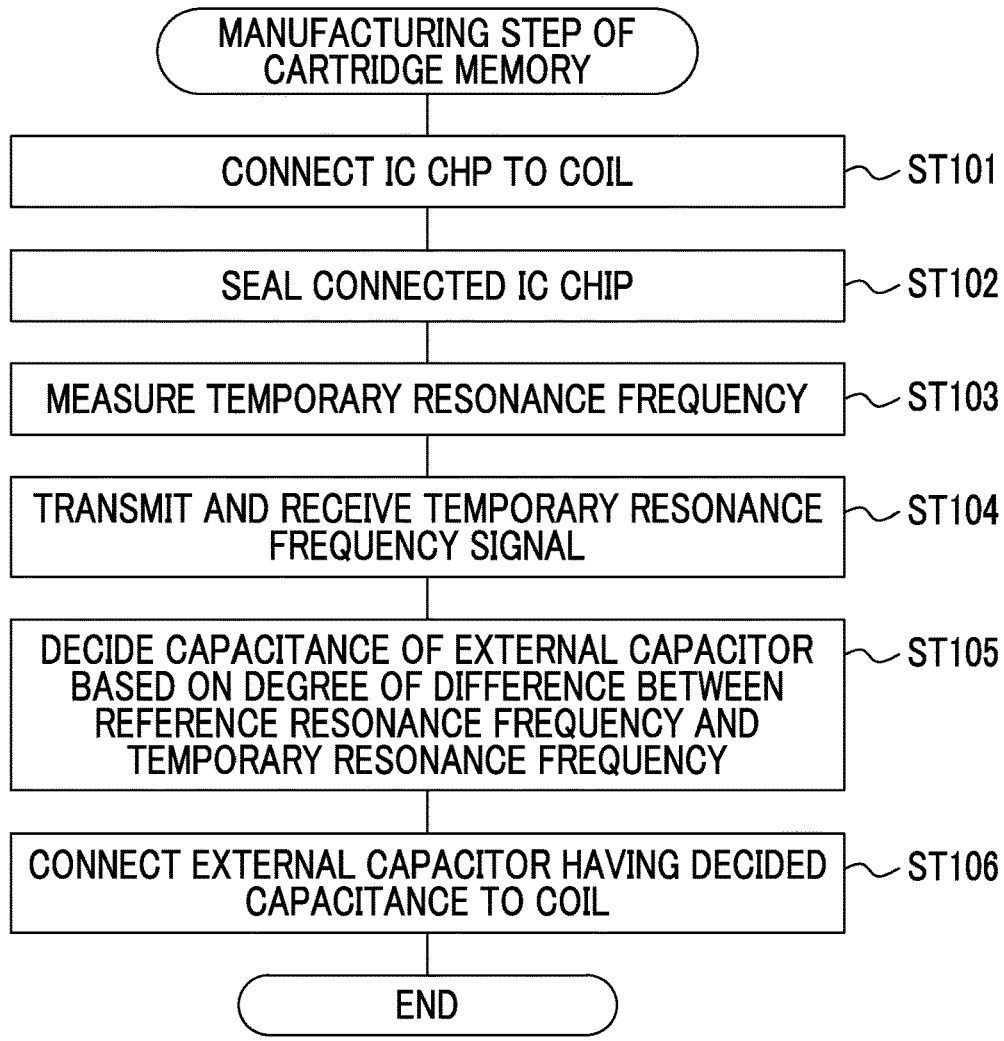
FIG. 14 is a flowchart illustrating an example of a manufacturing step of the cartridge memory according to the embodiment.

In a manufacturing step of the resonance circuit 92 as shown in FIG. 14 as an example, first, in Step ST101, the IC chip mounting device 124 connects the IC chip 52 to the coil 60 of the uncompleted CM 152. Thereafter, the manufacturing step progresses to Step ST102.

In Step ST102, the IC chip mounting device 124 forms the IC chip-mounted uncompleted CM 154 by sealing the IC chip 52 connected to the coil 60 of the uncompleted CM 152 with the sealing material 56. Thereafter, the manufacturing step progresses to Step ST103.

In Step ST103, the temporary resonance frequency measurement device 126 measures the temporary resonance frequency 150 that is the resonance frequency of the temporary resonance circuit 148 formed in the IC chip-mounted uncompleted CM 154. Thereafter, the manufacturing step progresses to Step ST104.

In Step ST104, the temporary resonance frequency measurement device 126 transmits the temporary resonance frequency signal 144 indicating the measured temporary resonance frequency 150 to the capacitance decision unit 134. The capacitance decision unit 134 receives the temporary resonance frequency signal 144 transmitted from the temporary resonance frequency measurement device 126. Thereafter, the manufacturing step progresses to Step ST105.

In Step ST105, the capacitance decision unit 134 decides the capacitance of the external capacitor 54 based on the degree of difference between the reference resonance frequency 132 read from the NVM 122B and the temporary resonance frequency 150 included in the temporary resonance frequency signal 144. The capacitance decision unit 134 transmits the capacitance information indicating the decided capacitance to the external capacitor mounting device 128. Thereafter, the manufacturing step progresses to Step ST106.

In Step ST106, the external capacitor mounting device 128 connects the external capacitor 54 having the capacitance indicated by the capacitance information to the coil 60 of the IC chip-mounted uncompleted CM 154. With this, the resonance circuit 92 is formed.

As described above, the cartridge memory 19 comprises the IC chip 52 and the external capacitor 54. The IC chip 52 has the internal capacitor 80 and is mounted on the substrate 26 on which the coil 60 configured to induce power with application of the magnetic field MF from the noncontact reading and writing device 50 is formed. The external capacitor 54 is externally attached to the IC chip 52. The internal capacitor 80, the external capacitor 54, and the coil 60 compose the resonance circuit 92 that resonates at a predetermined resonance frequency with application of the magnetic field MF. The IC chip 52 operates using power generated by the resonance circuit 92. A manufacturing method for the cartridge memory 19 includes measuring the temporary resonance frequency 150 in a state in which the external capacitor 54 is not connected to the IC chip 52 and in a state in which the IC chip 52 is connected to the coil 60, and deciding the capacitance of the external capacitor 54 based on the degree of difference between the reference resonance frequency 132 in a case where the cartridge memory 19 performs communication with the noncontact reading and writing device 50 through the magnetic field MF and the temporary resonance frequency 150. Therefore, according to this configuration, it is possible to easily match the resonance frequency of the resonance circuit 92 with the reference resonance frequency 132 compared to a case where the capacitance of the external capacitor 54 is decided without taking into consideration the degree of difference between the reference resonance frequency 132 and the temporary resonance frequency 150 at all.

The manufacturing method for the cartridge memory 19 further includes forming the resonance circuit 92 by mounting the external capacitor 54 having the decided capacitance on the substrate 26. Therefore, according to this configuration, it is possible to easily match the resonance frequency of the resonance circuit 92 with the reference resonance frequency 132 compared to a case where the capacitance of the external capacitor 54 is decided without taking into consideration the degree of difference between the reference resonance frequency 132 and the temporary resonance frequency 150 at all.

In the manufacturing method for the cartridge memory 19, the resonance circuit 92 is formed by connecting the external capacitor 54 to the substrate 26 by the surface mounting method. Therefore, according to this configuration, it is possible to mount the external capacitor 54 on the substrate 26 in a space-saving manner compared to a case where the external capacitor 54 is connected to the substrate 26 by a through-hole mounting method.

In the manufacturing method for the cartridge memory 19, the external capacitor 54 having the decided capacitance is mounted on the substrate 26 after the IC chip 52 in a state of being connected to the coil 60 is sealed with the sealing material 56. Therefore, according to this configuration, it is possible to protect the connection of the coil 60 and the IC chip 52 before the external capacitor 54 is mounted on the substrate 26.

In the manufacturing method for the cartridge memory 19, the temporary resonance frequency 150 is measured after the IC chip 52 is connected to the coil 60 in a state in which the external capacitor 54 is not connected to the IC chip 52. Therefore, according to this configuration, it is possible to correctly measure the temporary resonance frequency 150 compared to a case where the temporary resonance frequency 150 is measured in a state in which the external capacitor 54 is connected to the IC chip 52.

The manufacturing method for the cartridge memory 19 further includes transmitting the temporary resonance frequency signal 144 indicating the temporary resonance frequency 150, and receiving the transmitted temporary resonance frequency signal 144. In the manufacturing method for the cartridge memory 19, the capacitance of the external capacitor 54 is decided based on the temporary resonance frequency 150 indicated by the received temporary resonance frequency signal 144. Therefore, according to this configuration, it is possible to decide the capacitance of the external capacitor 54 in a short time compared to a case where the external capacitor 54 is decided without performing the transmission and reception of the temporary resonance frequency signal 144.

In the manufacturing method for the cartridge memory 19, the internal capacitor 80 and various drive elements are formed in an IC chip. Therefore, according to this configuration, it is possible to easily mount the internal capacitor 80 and various drive elements on the substrate 26 compared to a case where the internal capacitor 80 and various drive elements are not formed in an IC chip.

In the manufacturing method for the cartridge memory 19, the substrate 26 is a flexible type substrate. Therefore, according to this configuration, it is possible to form the cartridge memory 19 that is hardly broken, compared to a case where a non-flexible type substrate is used.

In the above-described embodiment, although a form example where the IC chip mounting device 124 mounts the IC chip 52 on the uncompleted CM 152 through the operation of the worker has been described, the technique of the present disclosure is not limited thereto. The IC chip mounting device 124 may mount the IC chip 52 on the uncompleted CM 152 in response to an instruction from the control device 121.

In the above-described embodiment, although a form example where the temporary resonance frequency measurement device 126 measures the temporary resonance frequency 150 of the temporary resonance circuit 148 and transmits the temporary resonance frequency signal 144 indicating the measured temporary resonance frequency 150 to the capacitance decision unit 134 in response to an instruction from the capacitance decision unit 134 has been described, the technique of the present disclosure is not limited thereto. The worker may measure the temporary resonance frequency 150 using an impedance analyzer, an oscilloscope, or the like and may input the temporary resonance frequency signal 144 indicating the measured temporary resonance frequency 150 to the computer 122 through the reception device 136.

Figure 15:
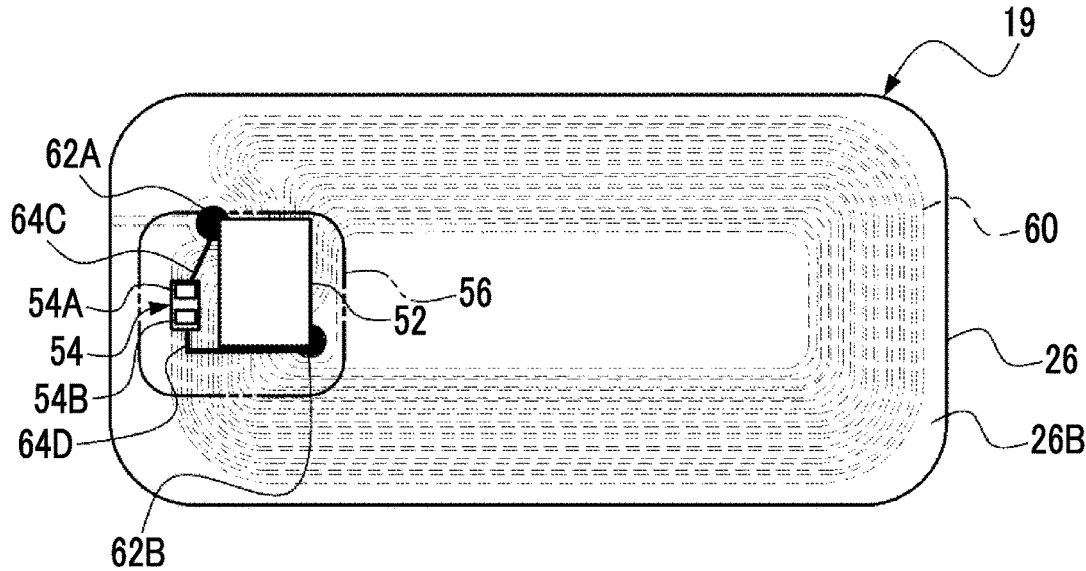
FIG. 15 is a top view showing a modification example of the front surface structure of the cartridge memory.

In the above-described embodiment, although a form example where the IC chip 52 and the coil 60 are connected using the wired connection method has been described, the technique of the present disclosure is not limited thereto. For example, as shown in FIG. 15, the IC chip 52 may be connected by a flip-chip connection method. In this case, for example, one terminal of the positive electrode terminal and the negative electrode terminal of the IC chip 52 is connected directly to the first conduction portion 62A, and the other terminal is connected directly to the second conduction portion 62B.

Figure 16:
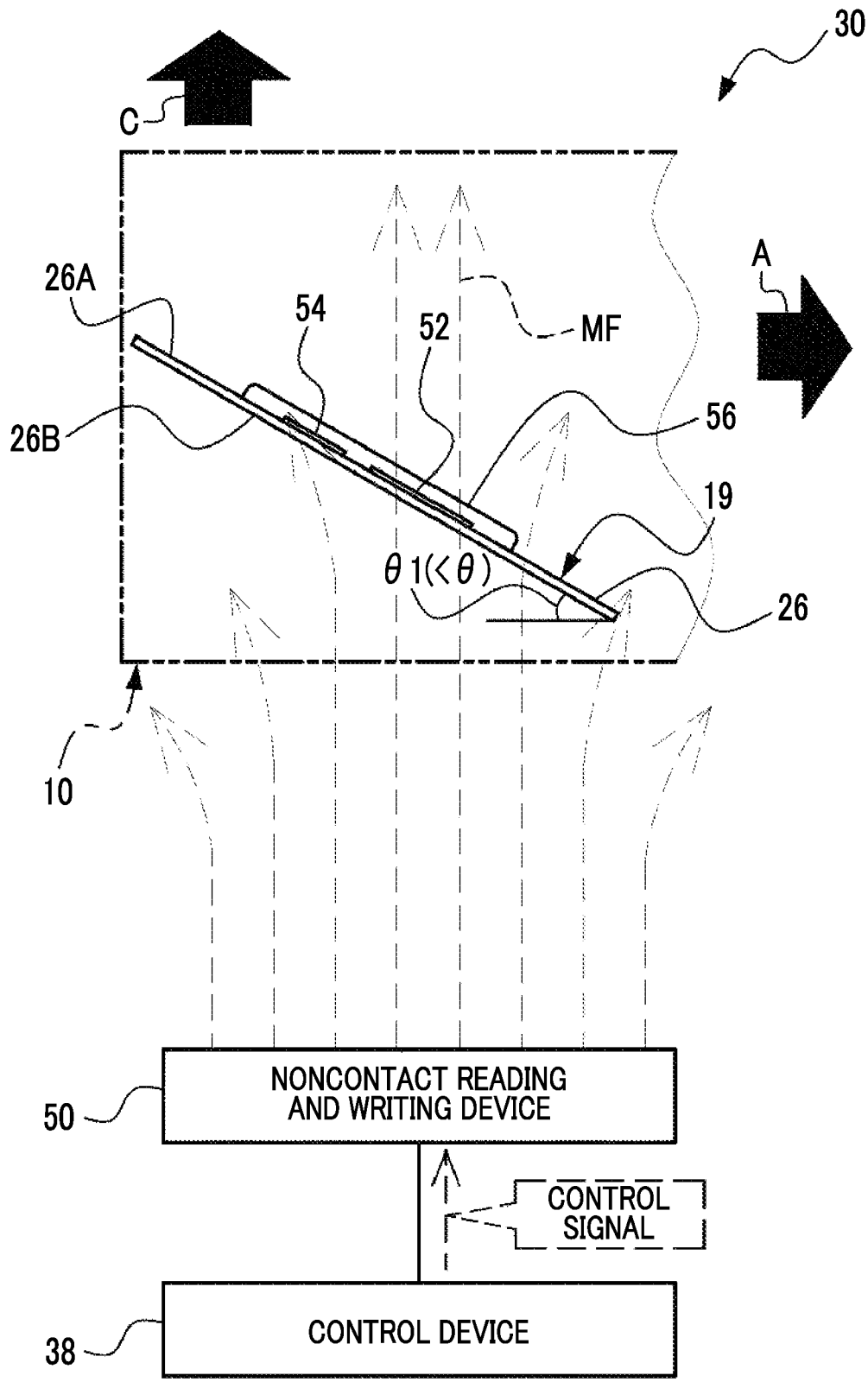
FIG. 16 is a conceptual diagram showing a modification example of an inclination angle of the cartridge memory in the magnetic tape cartridge.

In the above-described embodiment, although 45 degrees have been exemplified as the inclination angle θ, the technique of the present disclosure is not limited thereto. As shown in FIG. 16 as an example, an inclination angle θ1 smaller than the inclination angle θ may be employed as the inclination angle with respect to the reference surface 16A1 of the cartridge memory 19. An example of the inclination angle θ1 is 30 degrees. Since the inclination angle θ1 is an angle smaller than the inclination angle θ, it is possible to make a large number of lines of magnetic force pass through the coil 60 (see FIG. 7) compared to the case of the inclination angle θ. As a result, the coil 60 can obtain a large induced current in a state in which the magnetic tape cartridge 10 is loaded into the magnetic tape drive 30 compared to the case of the inclination angle θ.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A method for manufacturing a noncontact communication medium including a processing circuit that is mounted on a substrate on which an antenna coil configured to induce power with application of a magnetic field from an outside is formed, and has an internal capacitor, and an external capacitor that is externally attached to the processing circuit and composes a resonance circuit configured to resonate at a predetermined resonance frequency with application of the magnetic field, along with the internal capacitor and the antenna coil, the processing circuit operating using power generated by the resonance circuit, the method comprising:
   measuring a temporary resonance frequency in a state in which the external capacitor is not connected to the processing circuit and in a state in which the processing circuit is connected to the antenna coil;
   deciding capacitance of the external capacitor based on a degree of difference between a reference resonance frequency in a case where the noncontact communication medium performs communication with the outside through the magnetic field and the temporary resonance frequency; and
   forming the resonance circuit by mounting the external capacitor, having the decided capacitance, on a surface of the substrate by a surface mounting method, and connecting the external capacitor to the internal capacitor.

2. The method for manufacturing a noncontact communication medium according to claim 1,
   wherein the external capacitor having the decided capacitance is mounted on the substrate after the processing circuit in a state of being connected to the antenna coil is sealed with a sealing material.

3. The method for manufacturing a noncontact communication medium according to claim 1,
   wherein the temporary resonance frequency is measured after the processing circuit is connected to the antenna coil in a state in which the external capacitor is not connected to the processing circuit.

4. The method for manufacturing a noncontact communication medium according to claim 1, further comprising:
   transmitting a signal indicating the temporary resonance frequency; and
   receiving the transmitted signal,
   wherein the capacitance of the external capacitor is decided based on the temporary resonance frequency indicated by the received signal.

5. The method for manufacturing a noncontact communication medium according to claim 1,
   wherein the processing circuit is formed in an IC chip.

6. The method for manufacturing a noncontact communication medium according to claim 1,
   wherein the substrate is a flexible type substrate.

7. A noncontact communication medium comprising:
   a substrate on which an antenna coil configured to induce power with application of a magnetic field from an outside is formed;
   a processing circuit that is mounted on the substrate and has an internal capacitor; and
   an external capacitor that is externally attached to a surface of the substrate by a surface mounting method, the external capacitor connected to the internal capacitor of the processing circuit and composes a resonance circuit configured to resonate at a predetermined resonance frequency with application of the magnetic field, along with the internal capacitor and the antenna coil,
   wherein the processing circuit operates using power generated by the resonance circuit, and
   capacitance of the external capacitor is decided based on a degree of difference between a reference resonance frequency in a case where the noncontact communication medium performs communication with the outside through the magnetic field and a temporary resonance frequency measured in a state in which the external capacitor is not connected to the processing circuit and in a state in which the processing circuit is connected to the antenna coil.

8. The noncontact communication medium according to claim 7,
   wherein the processing circuit is formed in an IC chip.

9. The noncontact communication medium according to claim 7,
   wherein the substrate is a flexible type substrate.

* * * * *